United States Patent [19]

Vos

[11] 3,727,912

[45] Apr. 17, 1973

[54] CARD BRAKE

[75] Inventor: Leroy A. Vos, Saint Paul, Minn.

[73] Assignee: Sperry Rand Corporation, New York, N.Y.

[22] Filed: Feb. 11, 1971

[21] Appl. No.: 114,438

[52] U.S. Cl. ..........................271/51, 271/3, 271/74, 271/DIG. 2

[51] Int. Cl. ..........................B65h 9/14

[58] Field of Search..........................209/80.5; 271/DIG. 2, 74, 3, 71, 80, 51; 340/174.1 C, 174.1 E, 174.1 F

[56] References Cited

UNITED STATES PATENTS

| | | | |
|---|---|---|---|
| 3,420,521 | 1/1969 | Shebanow | 271/3 X |
| 1,669,552 | 5/1928 | Brunk | 271/DIG. 2 |
| 3,287,010 | 11/1966 | Stone et al. | 271/74 X |
| 3,371,929 | 3/1968 | Shebanow | 271/74 |

*Primary Examiner*—Evon C. Blunk
*Assistant Examiner*—Bruce H. Stoner, Jr.
*Attorney*—Thomas J. Nikolai, Kenneth T. Grace and John P. Dority

[57] ABSTRACT

In a system employing a rotating magnetic head drum and a plurality of magnetic cards retained in a cartridge, a braking means which stops the motion of a card as it is transported from the cartridge to a fixed, predetermined position around the drum's periphery. The brake comprises a plate having a plurality of holes therein with a partial vacuum being formed on a first side of the plate. A pick-off means picks off the leading edge of card as it is being transported from the cartridge to its fixed position around the drum and diverts said card along a path adjacent the second side of said plate. The partial vacuum effect pulls the card into friction contact with said plate and thereby slows its motion. A stop bar is positioned to completely stop the motion of the card after it has been slowed down substantially by the plate.

2 Claims, 6 Drawing Figures

PATENTED APR 17 1973

SHEET 1 OF 3

3,727,912

INVENTOR
LEROY A. VOS

BY Donald W. Phillion
ATTORNEY

INVENTOR
LEROY A. VOS

BY Donald W. Phillion
ATTORNEY

CARD BRAKE

This invention relates generally to rotating magnetic head random access files of the type employing a plurality of magnetic cards which can individually be selected from a storage means and transported to a predetermined position around the periphery of the drum for read/write purposes, but which do not rotate, and more specifically the invention relates to means for braking said selected cards as they are brought to a stop in their predetermined position around the periphery of the rotating drum.

BACKGROUND OF INVENTION

In prior art devices of the type defined above, braking means for the card being transported to its predetermined position around the periphery of the rotating drum have comprised a relatively simple stopping device such as a stop bar upon which the end of the card strikes and comes to a rather sudden stop. Such sudden stopping can cause damage to the end of the card with a resultant increase in the liklihood of malfunction of the system. More specifically if the end of the card should become damaged the possibility of its becoming caught or jammed upon some part of the structure during the transporting function is increased. Furthermore the sudden stopping of the card is likely to cause some bending or flexing of the card so that a portion of the magnetic surface thereof might rub the surface of the periphery of the rotating drum, thus destroying the properties of the card as a data storage medium.

SUMMARY OF INVENTION

A primary object of the invention is to provide a braking means for a random access file of the type described, which will brake the transported cards without damaging the ends thereof.

A second aim of the invention is to cause the cards to be decelerated substantially before the end thereof strikes the stop bar.

A third object of the invention is to provide a braking means which employs partial vacuum means to decelerate the card rapidly by forcing the non-magnetic surface of the card against a friction surface a short distance before the end of the card hits the stop bar.

A fourth purpose of the invention is the improvement of braking means employed in a rotating magnetic head random access file of the type described.

In accordance with the invention there is provided in combination with a random access memory file employing a rotating magnetic head drum and a storage cartridge containing a plurality of flexible magnetic cards having a magnetizable surface on one side thereof which can be individually and selectively transported to a non-rotating position around the periphery of the rotating drum, a braking means for braking the motion of the card to a stop so that said card stops in a predetermined position around the periphery of the rotating drum. The braking means includes a pickoff means for picking off the leading edge of said card as it is being transported around said drum and diverting said card into a slot in said brake, said slot having first and second walls with the first wall thereof having of an array of apertures. The openings of the apertures on the side of said first wall, which is adjacent the card, are substantially larger than the openings of the apertures on the other side of said first wall so as to increase the effect of a partial vacuum created on said other side of said first wall. Such increase in vacuum effectiveness is due to the smaller openings and also to the increased low pressure area acting upon the card as it covers the larger openings of said apertures. The second wall of said slot also contains an array of openings which function to pass air from the ambient atmosphere into the slot, thus substantially maintaining the ambient air pressure upon one side of the card as it enters the slot, while the other side of the card is exposed to a reduced air pressure. Thus the card is pressed against said first wall with increasing force as the card enters deeper into the slot. The friction between said first wall and said card functions to brake the motion of said card. Positioned beyond the arrays of apertures is a stop bar upon which the leading end of the decelerated card finally comes to rest.

Card positioning means, including bevelled surface edges at the bottom of said slot are provided to mate with bevelled edges at the leading end of the card, to position said card laterally within said slot.

In accordance with a specific embodiment of the invention the apertures within said first wall are formed by a pair of plates pressed firmly together and each containing an array of apertures which are aligned with each other. The first plate of said said is positioned adjacent said entering card and the diameters of the apertures therein are relatively large. The diameters of the apertures in said second plate are substantially smaller than those in said first plate with the difference in the diameters of the two arrays of apertures performing the same function as discussed generally above.

In accordance of another form of the invention the apertures of said first wall are formed in a single plate, with the openings on the side of the plate near the card being substantially larger than the openings of the apertures on the other side of said plate. The particular volumetric configuration of the apertures is not particularly significant. For example, the cross-sectional areas of said apertures could be circular in nature, or rectangular, or any other geometric configuration. The primary consideration is that the openings on the side of said first wall near the card be large compared to the openings on the other side of said plate. Also it is desirable that the volume of the aperture for given unit of aperture length become greater as the distance from the card decreases. Such aperture configuration creates a mechanical equivalent of a capacitance in that some interval of time is required for the air pressure within the aperture to be reduced to that of the partial vacuum on said other side of said first wall after the card passes thereby. Because of this feature the force on the card is increased more gradually and sudden changes in the frictional force between the card and said first wall are avoided.

SUMMARY OF DRAWINGS

The above-mentioned objects and features of the invention will be more fully understood from the following detail description thereof when read in conjunction with the drawings in which.

DESCRIPTION OF INVENTION

To establish the environment in which the present invention finds practical application, a brief description of a rotating head magnetic storage system will now be presented.

Figure 1:
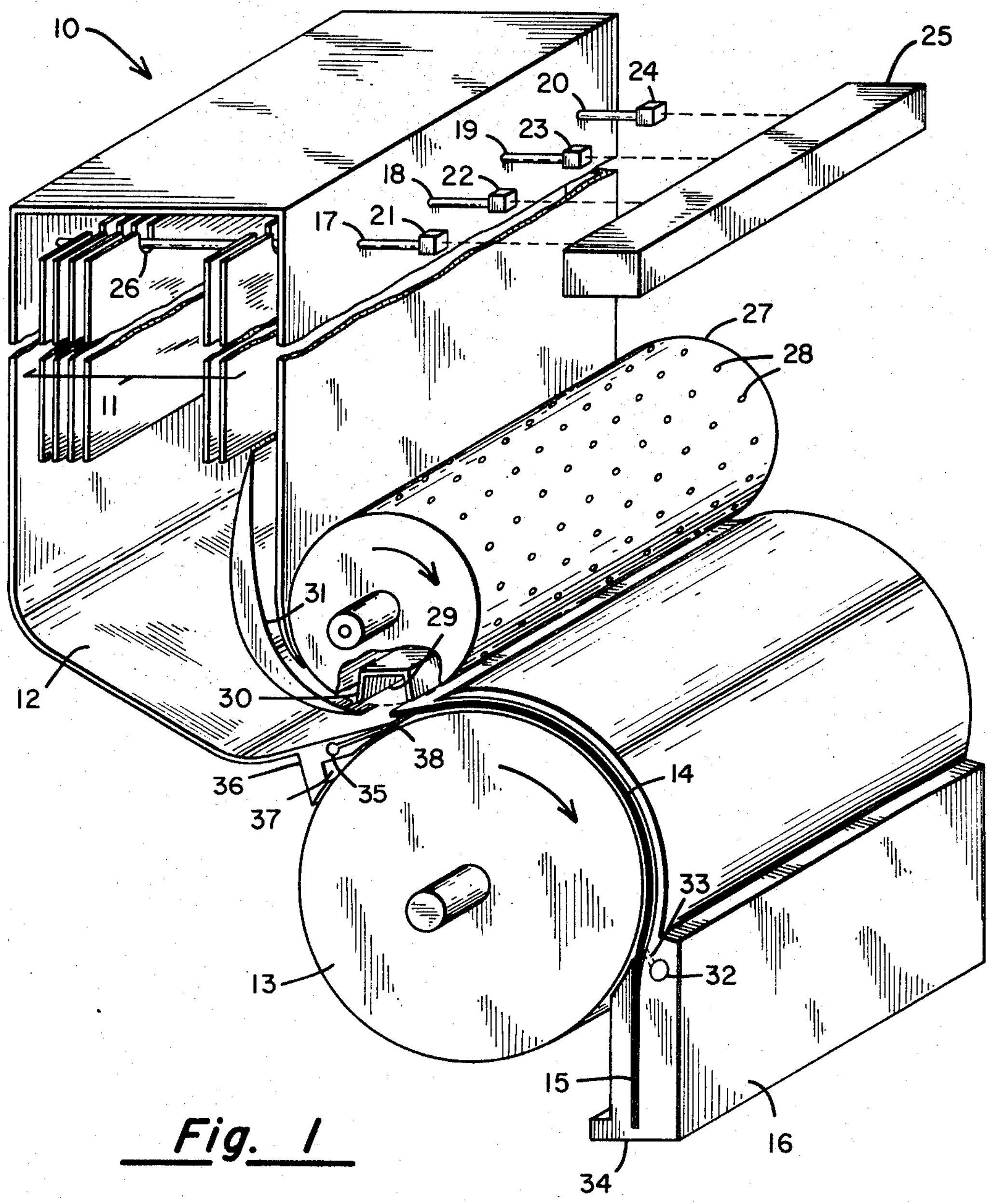
FIG. 1 is a perspective view of the complete random access file memory showing the relation of the brake to the entire file system.

Referring now to FIG. 1 there is shown a card holding cartridge 10 which holds a plurality of flexible magnetic cards 11, each of which is suspended from the rods 17, 18, 19 and 20. The rods 17–20 have cross-sectional areas of coded configuration such that when certain of the rods are rotated a given angular amount, a selected card will drop from the cartridge 10 into the chute 12 and be transported around the rotating magnetic drum 13 into the slot 15 of brake 16.

The angular position of the coded rods 17–20 are controlled by a control means represented schematically by block 25 which functions generally to receive a signal and then translate such signal into angular motion to rotate the rods 17–20 into predetermined angular positions to release a selected card of cards 11.

A shoe 36 has a partial vacuum chamber 37 therein which functions to strip the periphery of the drum of a portion of the air adjacent thereto, thus creating a reduced air pressure on the drum surface. To avoid abrasion of the card as it is transported from chute 12 around the periphery of drum 13 there is provided a positive air pressure chamber 35 which emits a column of air out of slot 38; said column of air providing an air bearing for the card as it passes thereacross.

The return of the cards is effected by a capstan 27 having a plurality of apertures 28 therein. A continuous partial vacuum is drawn in the chamber 29 which is defined by channel 30. Such partial vacuum functions to pull the trailing end of the card 14 towards the capstan 27 when the partial vacuum within the chamber 37 is released. In this manner the capstan 27, which is rotating in a clockwise direction, literally throws the card back up into the cartridge 10 where appropriate means are provided to receive it and again suspend it on the rods 17-20. For a further and more detailed description of the overall operation of the system reference is made to co-pending application Ser. No. 114,458 filed on Feb. 11, 1971 by G. D. Bukovich, et al. and entitled RHD-CARD TRANSPORTATION AND POSITIONING.

Figures 2, 3:
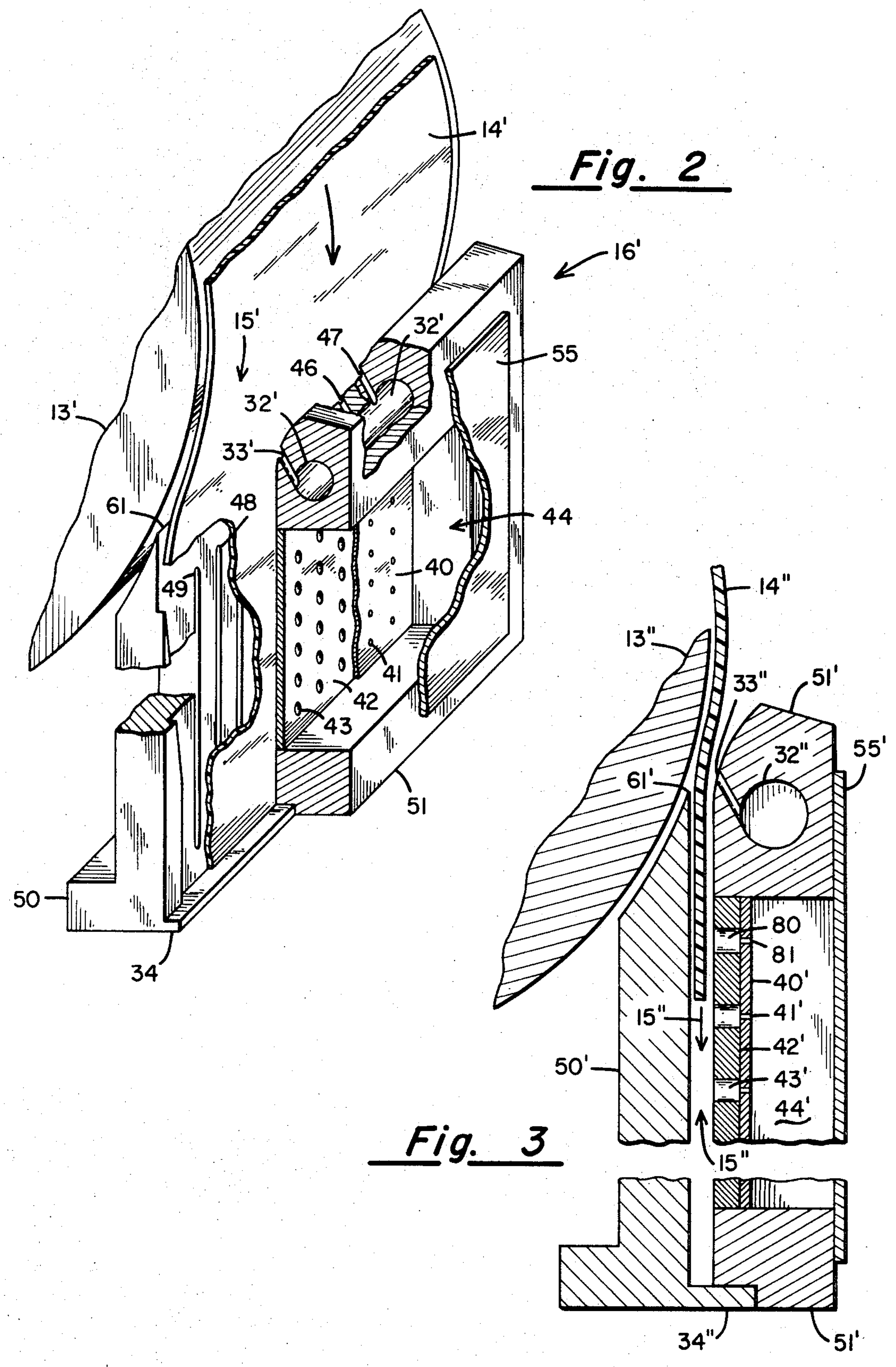
FIG. 2 is a perspective view of the braking means with portions thereof broken away, and its relation to both the rotating magnetic head drum and the card being inserted into the brake.
FIG. 3 is an enlarged sectional view of the brake and its relation to the rotating head drum and the card being inserted therein.

Referring now to FIG. 2 the magnetic card 14' is shown as being wrapped around the drum 13' in its predetermined peripheral position and fully inserted in the slot 15' of brake 16'. The brake 16' consists of two principal parts identified by reference characters 50 and 51, which parts fit together in such a manner as to create the slot 15' therebetween and into which slot the card 14' is inserted.

The element 51 of brake 16' comprises a pair of plates 42 and 40, each of which has an array of apertures therein. More specifically the plate 42 has an array of apertures 43 therein, and plate 40 has an array of apertures 41 therein. The apertures 43 are considerably larger in diameter than the apertures 41. Also the plate 42 is preferably, although not necessarily, thicker than the plate 40.

A partial vacuum is drawn in the chamber 44 which is covered by plate 55. Due to the small size of the apertures 41 in plate 40 such a partial vacuum can be maintained in chamber 44 even though a card 14' is not present in the slot to block the flow of air into chamber 44 through aperture arrays 43 and 41 in plates 42 and 40. However, if only the small apertures 41 were present in the structure and were adjacent the card 14', the total cross-sectional area of reduced air pressure exposed to the card 14' would be insufficient to produce adequate braking effect. By employing the second plate 42, with the larger aperture 43, the cross-sectional area of reduced air pressure exposed to the card 14' is increased, with a consequent increase in braking pressure as the card moves further into the slot 15' and covers up an increasing number of the apertures 43.

It is to be noted that the second main element 50 of the brake 16' has a series of elongated apertures, such as apertures 48 and 49 therein, to permit a flow of air from the ambient atmosphere therethrough and to maintain the ambient air pressure on the left-hand side of the card 14', as the card is shown in FIG. 2.

The large apertures 43 in plate 42 perform a second function in that they provide the mechanical equivalent of a capacitance as the card enters into the brake 16'. More specifically, a finite amount of time is required for the air pressure within the large apertures 43 to decrease after being covered by card 14', thus minimizing sudden, sharp braking effects upon the card as it passes a row of apertures. An additional way of distributing the braking effect more uniformly as a function of time is to arrange each row of apertures to form an angle $\alpha$ with the leading edge of the entering card, where $\alpha$ is greater than 0° and less than 45°.

A means for picking off the card from the periphery of the rotating drum comprises a row of orifices, such as orifices 33', 46 and 47. These orifices are arranged along the top of the brake 16' in a line parallel to the axis or rotation of the drum 13' and also parallel to the leading end edge of the card 14'. Jets of air are caused to be emitted from the aforementioned row of orifices by means of a chamber 32' which is caused to have positive air pressure therein. The said air jets from the row of orifices are directed against the periphery of drum 13'. Thus, as the leading end edge of the card 14' which is being transported, approaches the junction of the air jets upon the periphery of the drum 13', an air turbulence is set up which functions to separate the card 14' from the periphery of the drum so that the card is diverted into slot 15' by means of edge 61.

In a cross-sectional view of FIG. 2 as represented in FIG. 3 the card 14'' is shown as being only partially entered into the slot 15''. The card has passed the first row of large apertures represented by aperture 80, and the first row of small apertures, represented by aperture 81, which rows can be seen to be aligned. As soon as card 14'' has passed the aperture 80 the air pressure therein begins to decrease through the aperture 81 which leads to the vacuum chamber 44'.

Figures 4, 5, 6:
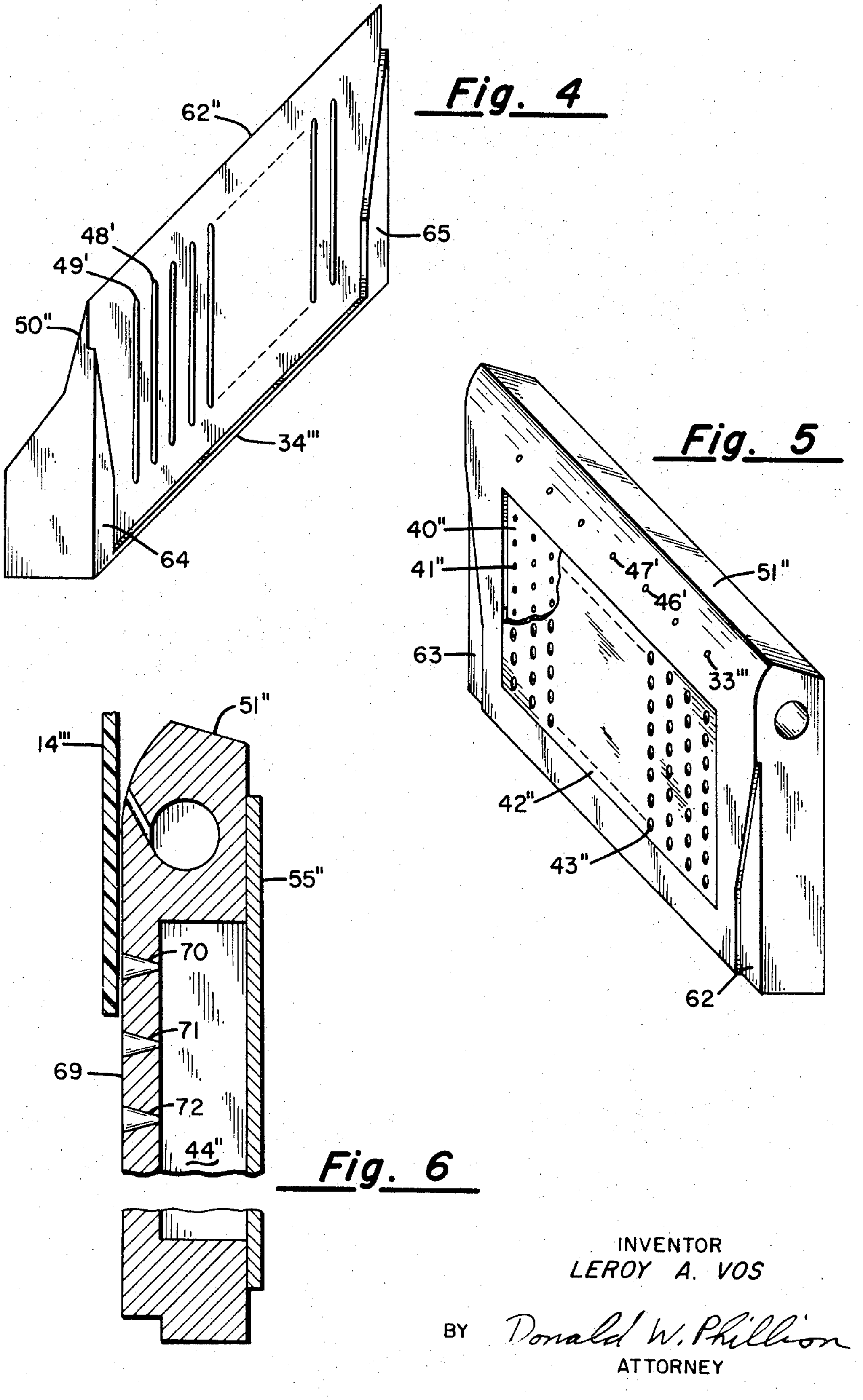
FIG. 4 is a perspective view of one main portion of the brake.
FIG. 5 is a perspective view of the other main portion of the brake.
FIG. 6 is a cross-sectional view of another form of the brake utilizing tapered apertures.

Referring now to FIG. 4 there is shown a perspective view of a main portion 50'' of the brake. In this view the row of apertures, such as the apertures 49' and 48', which permits ambient air pressure to flow into the slot 15' (FIG. 2), can be clearly seen. Also the guides 64 and 65 and the stop bar 34''' are clearly shown. The said guides 64 and 65 mate with the beveled portions 62 and 63 of the perspective view of the other main portion 51'' of the brake shown in FIG. 5. The thickness of the guiding elements 64 and 65 of FIG. 4 is greater than the depth of the beveled portions 62 and 63 of FIG. 5 by an amount equal to the width of the slot 15 as shown in the structures of FIGS. 2 and 3. Thus when the two elements 50'' and 51'' of FIGS. 4 and 5 are fitted together, the slot 15'' of FIG. 3 is automatically formed therebetween.

In FIG. 5 the row of apertures, including apertures 33''', 46' and 47', which project the jets of air onto the periphery of the rotating drum to pick off the card being transported to the brake, are shown. The surface of the plate 42'', which faces the entering card, is shown with a portion thereof broken away to show the plate 40'' positioned immediately behind the plate 42''.

Referring now to FIG. 6 there is shown another form of the element 51'' of the brake. In the embodiment of FIG. 6 the two arrays of apertures in the plates 40 and 42 of FIG. 2 have been replaced with one array of apertures in a single plate 69. Each of the apertures in plate 69, however, is conically shaped, such as shown by apertures 70, 71, and 72, with the smaller openings being within the vacuum chamber 44'' and the larger openings being adjacent the incoming card 14'''. With the aperture configuration of FIG. 6 the same overall effect is obtained as with the large and small apertures of the embodiment shown in FIG. 3.

It is to be understood that the forms of the invention shown and described herein are but preferred embodiments thereof and that various changes may be made in the design thereof, as for example in the shape of the openings in the plate between the vacuum chamber and the card, without departing from the spirit or scope of the invention.

What is claimed is:

1. In a random access file of the type including a rotating magnetic head drum and a plurality of flexible magnetic cards having first and second ends and individually selectable to be transported with said first end leading to a predetermined, non-rotating position around the periphery of said rotating magnetic head drum, an improved braking means for stopping the motion of a card being transported to said predetermined position around the periphery of said rotating drum comprising:

first and second walls each having first and second sides and constructed to form a slot therebetween which is positioned to receive said transported card;

pick-off means for picking off the leading end of said card as it is being transported and diverting said leading edge into said slot;

said pick-off means including an air jet creating means for creating and directing a jet of air upon the surface of said rotating drum along a given line parallel to the axis of said drum and in the path of the leading end of said card being transported, and in a direction defined by a line lying in the intersection of a first plane normal to the axis of said rotating drum and a second plane lying between the radial plane of the drum extending to said given line and a plane tangential to the periphery of said drum at said given line;

said first wall having a first array of apertures therethrough, with the openings on the said first side of said first wall adjacent said slot being larger than the openings on the second side of said first wall;

said second wall having apertures therethrough of a size to cause the air pressure within said slot to remain substantially equal to the ambient air pressure outside said second wall, with respect to said slot;

means for creating an air pressure on the second side of said first wall which is less than the air pressure within said slot;

and stop bar means positioned at the bottom of said slot and in the path of the leading end of said card to completely stop the motion of said card being transported.

2. A braking means as in claim 1 in which said first wall comprises:

a first plate and a second plate each having first and second major surfaces with the first major surfaces of each plate constructed to mate with each other in a continuously contacting manner;

said first plate being positioned with its second major surface forming one surface of said slot;

said first plate and said second plate having second and third arrays of apertures formed therein, respectively, with said second and third arrays of apertures being aligned with one another, and with each aperture of said first array being comprised of an aperture of said second array and an aperture of said third array;

the apertures of said second array being larger than the apertures of said third array.

* * * * *